US011822327B2

(12) United States Patent
Magzimof et al.

(10) Patent No.: US 11,822,327 B2
(45) Date of Patent: Nov. 21, 2023

(54) SAFETY OF AUTONOMOUS VEHICLES BY REMOTE SUPPORT REQUEST

(71) Applicant: Phantom Auto Inc., Mountain View, CA (US)

(72) Inventors: Shay Magzimof, Palo Alto, CA (US); Paul Samuel Spencer, Modi'in (IL)

(73) Assignee: Phantom Auto Inc., South San Francisco, CA (US)

( * ) Notice: Subject to any disclaimer, the term of this patent is extended or adjusted under 35 U.S.C. 154(b) by 162 days.

(21) Appl. No.: 17/566,626

(22) Filed: Dec. 30, 2021

(65) Prior Publication Data

US 2022/0121197 A1    Apr. 21, 2022

Related U.S. Application Data

(62) Division of application No. 16/191,886, filed on Nov. 15, 2018, now abandoned.
(Continued)

(51) Int. Cl.
*G05D 1/00* (2006.01)
*G07C 5/00* (2006.01)
(Continued)

(52) U.S. Cl.
CPC .............. *G05D 1/0011* (2013.01); *B60T 7/06* (2013.01); *G05D 1/0055* (2013.01);
(Continued)

(58) Field of Classification Search
None
See application file for complete search history.

(56) References Cited

U.S. PATENT DOCUMENTS 9,157,752 B1   10/2015   Fernandez Garcia et al.
9,507,346 B1 *  11/2016   Levinson ............. G05D 1/0291
(Continued)

FOREIGN PATENT DOCUMENTS

WO    WO 2016/183525 A1    11/2016

OTHER PUBLICATIONS

United States Office Action, U.S. Appl. No. 16/191,886, dated Oct. 6, 2021, 14 pages.
(Continued)

*Primary Examiner* — Abdhesh K Jha
(74) *Attorney, Agent, or Firm* — Fenwick & West LLP (57) ABSTRACT

A remote support system provides support to an autonomous drive system of a vehicle in response to a support request. The remote support may include guiding the autonomous drive system of the vehicle through a hazardous environment. A call to the remote support system may be initiated, for example, via a user interface control button or by scanning a bar code, QR code, or RFID associated with the vehicle on a device that sends the code with vehicle information to the remote support system. The remote support system may determine an urgency of the request to assess whether immediate support should be initiated or whether to first initiate a communication connection with a passenger. Furthermore, an emergency brake system of the vehicle may be triggered by the remote support system or in response to the vehicle losing a connection to the remote support system during a support request.

12 Claims, 7 Drawing Sheets

Related U.S. Application Data (60) Provisional application No. 62/696,779, filed on Jul. 11, 2018, provisional application No. 62/607,241, filed on Dec. 18, 2017.

(51) Int. Cl.
 B60T 7/16 (2006.01)
 B60T 7/06 (2006.01)
 G07C 5/08 (2006.01)

(52) U.S. Cl.
 CPC ........... G05D 1/0088 (2013.01); G07C 5/008 (2013.01); G07C 5/0808 (2013.01); *B60T 2270/82* (2013.01)

(56) References Cited

U.S. PATENT DOCUMENTS

| | | | |
|---|---|---|---|
| 9,606,539 | B1 | 3/2017 | Kentley et al. |
| 9,720,410 | B2 * | 8/2017 | Fairfield ............... G05D 1/0038 |
| 9,786,154 | B1 | 10/2017 | Potter et al. |
| 10,007,263 | B1 | 6/2018 | Fields et al. |
| 10,386,836 | B2 | 8/2019 | Lockwood et al. |
| 10,459,440 | B2 * | 10/2019 | Rust ..................... G05D 1/0238 |
| 10,564,638 | B1 | 2/2020 | Lockwood et al. |
| 10,591,912 | B2 | 3/2020 | Pedersen et al. |
| 2015/0248131 | A1 | 9/2015 | Fairfield et al. |
| 2016/0116293 | A1 | 4/2016 | Grover et al. |
| 2016/0167653 | A1 | 6/2016 | Malone et al. |
| 2016/0334229 | A1 | 11/2016 | Ross et al. |
| 2016/0334797 | A1 | 11/2016 | Ross et al. |
| 2017/0123422 | A1 | 5/2017 | Kentley et al. |
| 2017/0192423 | A1 | 7/2017 | Rust et al. |
| 2017/0308082 | A1 | 10/2017 | Ullrich et al. |
| 2018/0088571 | A1 | 3/2018 | Weinstein-Raun |
| 2018/0310159 | A1 | 10/2018 | Katz et al. |
| 2018/0365908 | A1 | 12/2018 | Liu et al. |
| 2019/0011910 | A1 | 1/2019 | Lockwood et al. |
| 2019/0049948 | A1 | 2/2019 | Patel et al. |
| 2019/0121357 | A1 | 4/2019 | Zhang et al. |
| 2019/0258246 | A1 | 8/2019 | Liu et al. |
| 2020/0068434 | A1 | 2/2020 | Pedersen et al. |
| 2020/0272150 | A1 | 8/2020 | Lennie et al. |
| 2021/0149389 | A1 | 5/2021 | Weslosky et al. |

OTHER PUBLICATIONS

United States Office Action, U.S. Appl. No. 16/191,886, dated Mar. 12, 2021, 13 pages.
United States Office Action, U.S. Appl. No. 16/191,886, dated Sep. 30, 2020, 12 pages.
European Patent Office, Extended European Search Report and Opinion, European Patent Application No. 23163422.1, dated Jun. 7, 2023, 7 pages.

* cited by examiner

SAFETY OF AUTONOMOUS VEHICLES BY REMOTE SUPPORT REQUEST

CROSS-REFERENCE TO RELATED APPLICATIONS

This is a divisional application of U.S. patent application Ser. No. 16/191,886 filed Nov. 15, 2018, which claims the benefit of U.S. Provisional Application No. 62/607,241 filed on Dec. 18, 2017 and U.S. Provisional Application No. 62/696,779 filed on Jul. 11, 2018, the contents of which are incorporated by reference herein.

TECHNICAL FIELD

This disclosure describes a method and system for provision of support to autonomous vehicles that encounter various situations that the autonomous system is unable to address unaided. Support is requested by the provision of units by which parties internal to, or external from, the autonomous vehicle can request assistance for the autonomous vehicle from a remote support system.

BACKGROUND

Autonomous control systems for vehicles are under development by a multitude of parties. These systems are intended to provide the possibility to transport passengers and/or materials in vehicles without the necessity for a person to be in the driving seat. Inevitably, these systems will encounter situations which the autonomous system is not able to address, such as road environments outside of the operational design domain of the autonomous system, vehicle component issues or failures that the autonomous system is not able to address, or simply that a passenger in a vehicle desires external support for the vehicle. Provision for dealing with these situations must be provided at reasonable cost, without the need for a person with the appropriate class of driving license to continually be physically present in every intelligent transport system (ITS) on the road.

SUMMARY

This disclosure describes a method and system for provision of support to an autonomous vehicle that may encounter various situations for which external support is desirable or necessary. Support is accorded by the provision of a plurality of buttons and sensors to request communication with a remote support system that may involve a natural person, a remote artificial intelligence (AI) agent, or a combination thereof. A remote AI system may be able to successfully perform the driving task where an onboard autonomous control unit fails due to a number of factors, such as access to more computational resources, proprietary techniques employed by the third party operating the remote AI, or access to auxiliary data sources. Further in this text the terms "remote support system" may encompass systems involving inputs from a natural person or from a remote AI agent.

In a particular embodiment, a request for remote support for an autonomous drive system of a vehicle is initiated at the vehicle. The remote support system receives the request for remote support. Responsive to the request, a support connection is initiated between the vehicle and the remote support system. Sensor information relating to the state of the vehicle is received from the vehicle at the remote support system via the support connection. The remote support system analyzes the sensor information to determine an urgency metric associated with the state of the vehicle. The remote support system determines if the urgency metric exceeds a predefined threshold, and uses this information to determine whether to initiate a remote guidance to guide the autonomous drive system of the vehicle. Responsive to determining that the urgency metric does not exceed the predefined threshold, a communications connection accessible to a passenger of the vehicle may be initiated to acquire additional information for the subsequent decision-making process. If such a channel is successfully established, the remote support system receives communications from the passenger via the communications connection, and determines based on the communications from the passenger, whether to initiate a remote guidance to guide the autonomous drive system of the vehicle. Responsive to determining to initiate the remote drive guidance, the remote support system provides the remote guidance to the vehicle.

The remote support system may furthermore provide the remote guidance to the vehicle upon determining that the urgency metric exceeds the predefined threshold.

If the remote support system instead determines not to initiate the remote guidance based on the communications from the passenger, the communications connection and the support connection with the vehicle are terminated.

In an embodiment, the request for remote support may include receiving a code from a computer device relating to relating to a bar code, QR code, RFID tag, or other code visible on the vehicle, the code encoding identifying information associated with the vehicle.

Furthermore, the remote support system may analyze the state of the vehicle to determine whether to activate an emergency stop system of the vehicle. Responsive to determining to activate the emergency stop, the remote support system may send an emergency stop signal to the vehicle.

In another embodiment, an autonomous drive system of a vehicle in communication with a remote support system initiates an emergency braking procedure. The vehicle requests, from the remote support system, support for the autonomous drive system of the vehicle. A counter of the vehicle is set to a predefined value. At a predefined time interval, the vehicle checks if the vehicle received a keep alive signal from the remote support system. Responsive to failing to receive the keep alive signal in the predefined time interval, the vehicle decrements the counter of the vehicle. The vehicle controls a braking system of the vehicle to execute an emergency stop responsive to the counter reaching zero.

If the vehicle receives the keep alive signal, it resets the counter to the predefined value.

In an embodiment, controlling the braking system of the vehicle to execute the emergency stop includes detecting if a drive-by-wire system of the vehicle is enabled, and controlling the braking system of the vehicle to execute the emergency stop by sending a command through the drive-by-wire system.

In another embodiment, the vehicle may receive an emergency stop command from the remote support system and control the braking system of the vehicle to execute the emergency stop responsive to the emergency stop command.

In an embodiment, requesting the support comprises the vehicle detecting selection of a user interface control within the vehicle to request the support, and sending a request for the support in response to the selection.

Other embodiments and aspects of different possible implementations are described in detail herein.

DETAILED DESCRIPTION

Embodiments of the present disclosure provide methods for support of vehicles, and other systems, which may typically be autonomous in operation, but which on occasions require some form of assistance from an external resource. In this disclosure, usage of the term vehicle may include cars, trucks, and other land vehicles, and may also include seaborne, subterranean and airborne systems.

In a plurality of different situations, an autonomous vehicle requires support from some external resource, but does not necessarily need to operate an emergency stop button to disable the vehicle. Some of these situations may occur to increase the safety of passengers within the vehicle, and/or parties and property outside of the vehicle. Others may occur simply at passenger request to increase comfort and confidence of travel. The support may be provided by a remote support system. Call types to the remote support system for support may include, for example, standard call requests and emergency call requests. Also, certain requests may be limited to particular classes of authorized users. Users may be categorized as standard users, authorized users, and public safety users. An additional source of calls for remote support may be by remote activation of sensors. For example, a remote device may be operated by a natural person if it is not safe to approach the autonomous vehicle to operate a physical button on the body of the vehicle. Another example includes a sensor being activated by a traffic management, perhaps by a signal from a beacon in the vehicle locality. This may occur in a scenario that an accident has occurred in the locality and safety services require that autonomous vehicles are provided with remote support while in the relevant area. A further embodiment is a public safety official issuing a request to the remote support system through a wireless system, using the vehicle's registration, or some other identifying feature, such as barcode, QR tag, RFID tag, or similar, on the vehicle. A further embodiment is the onboard autonomous control unit assessing the low confidence level of its decision-making process and either placing a call for remote support, or supplying a most recent data feed segment to a third-party remote AI agent and, in case its performance or confidence level is found to be superior, placing a call to the remote AI agent.

In one embodiment, a passenger within the vehicle, who does not have any special rights with regard to operating the vehicle, may issue a request for remote support. The remote support system will respond appropriately depending on the request type. An example is a passenger traveling in an autonomous vehicle operating as a taxi service.

In another embodiment, an external authorized party such as a police or safety official, may be authorized to issue a request to a remote support system in connection with an autonomous vehicle. An example is a situation that a safety official does not wish to operate the emergency stop of an autonomous vehicle, which would leave the vehicle in and unsafe or undesired location. Instead, the safety official may request the remote support system to direct the autonomous vehicle to another desired location, or to take a desired routing.

In another embodiment, some medically important event occurs during vehicle travel. For example, a passenger within the vehicle may be supervised by medical monitors during the journey. Should a monitor measurement fall outside some acceptable normal value, indicating a problem with the passenger, this may trigger a request to a remote support system. Actions taken by the remote support system may include initiating a voice or video call link with the passenger(s) in the vehicle, or initiating a change in planned journey to re-direct the vehicle to allow for provision of medical assistance.

In a further embodiment, a vehicle fleet management system, or similar, may request that a certain vehicle in the fleet receive support from a remote support system. This request may be communicated through a cellular communication system, or other method. Further, this request is communicated from the certain vehicle to the remote support system. The remote support system may then act according to the received request.

In another embodiment, it is conceived that a remote support request may be triggered based on physical location. In other embodiments, the request for remote support may also be dependent on time. An example of a situation based on physical location is in the locality of a highly pedestrianized region, such as near a shopping zone. In another example, time dependency may be enabled in the locality of a school to align with entry and exit hours for the school.

The scheme for requesting support from an external resource may include a call system using buttons on the dashboard, or located at another position in the vehicle, such as in the roof, or on some structure within the vehicle, such as a seat post, table, or similar.

In a further embodiment, the safety call unit may be implemented using a keyfob or similar device. This is of particular relevance if the passenger is not mobile. The keyfob or similar, device may be connected to the vehicle system through wiring, or a wireless connection, using a technology such as Bluetooth, WiFi, infrared, ultrasound, or similar. In another embodiment, the call system may be implemented using a cellular phone application. In another embodiment, the call system may be implemented as a smart watch, or other worn device. The device may be connected to the vehicle system either wired or wirelessly.

In a further embodiment, a request to the remote support system may be requested by a system in the autonomous vehicle. An example of such a scenario is a case that a door has not been successfully closed before travel, or that is opened after travel commences. Another example is a case that a passenger has not employed a seatbelt, or has released it during travel. A further example that a remote support request may occur, is a situation that the autonomous vehicle detects an unexpected event, or determines that the environment is outside of its designed operation range. The remote support system may take appropriate action on receipt of such a request, that may include initiation of a voice or video link with the vehicle passenger(s).

In another embodiment, there may be certain types of restricted requests that may only be made by an authorized passenger. In such a situation, a process to authorize the requesting user may be made, for example, by use of biometric information. Some examples are by finger print, iris recognition, face recognition, voice recognition, or other types of sensors. An example of a request by an authorized passenger is an employee on a public transportation vehicle, who requests a special action, such as an unscheduled stop. A further example is medical personnel travelling with a patient in a vehicle.

In another embodiment, there may be certain types of restricted requests that may only be made by an external authorized party. One example of a request that includes authorization is a police or safety official that requests an access code from a remote database. Usage of this access when making a request through the vehicle for remote support allows for the request to be recognized as being issued from an official source. A type of request that may occur is by a police official who can direct the vehicle to move to a certain location not related to the vehicle destination. Another such type of request is by an official who may initiate a request for linkage of the vehicle into a convoy. A further type of request is by a safety official who may request that the vehicle doors to be opened.

In another embodiment, a scenario may occur in which it is not safe to approach the autonomous vehicle. An external natural person may be able to issue a request by a direct link to the remote support system based on vehicle registration. Access to such information may be by the use of external identifying information such as barcode, QR code, RFID tag. On reception of such a request, the remote support system may take the appropriate steps.

In a further embodiment, certain types of requests may be triggered by proximity to a beacon that conveys a request to a passing autonomous vehicle. An example of this is a beacon on a highway as part of a traffic control system. In a zone where, for example an accident has occurred, autonomous vehicles may be required to revert to a remote support mode, or a partially assisted mode. Such a request may be transmitted to the vehicle wirelessly, by a suitable technology such as WiFi or Bluetooth. Alternatively, a request may be conveyed to a vehicle visually, for example by appropriate road signage. In another embodiment, the request from the traffic control system may occur directly to the remote support system.

In a further embodiment, the assessment of the urgency of requested remote support may be assessed according to the vehicle's position and status. For example, if the vehicle is traveling on a highway at a speed not consistent with other traffic, the request may be assessed as being at a higher priority.

In a further embodiment, the onboard autonomous control unit continuously supplies the video and telemetry feeds it collects to an appropriate marketplace for third-party remote AI agents to analyze. As soon as the confidence level of ITS operation falls below a predefined threshold, the ITS automatically submits an assistance request to agents subscribed to its feed and posts an appropriately formed bid. The AI agents competing for the bid may then post their own confidence levels for the current road situation analysis. The autonomous control unit may then choose a remote AI agent based on the advertised confidence level or other factors.

In an alternative embodiment, the ITS only starts transmitting data to the remote AI marketplace after a certain trigger fires. Examples of such triggers are the confidence level falling below a certain threshold, or the vehicle approaching to a zone that was previously found to be difficult to traverse by the onboard control unit.

In an alternative embodiment, the ITS may only transmit the video and telemetry feeds, and allow the parties controlling the remote AI agents to name their asking price.

In an alternative embodiment, the ITS may transmit the video and telemetry feeds to a predefined partner service that continuously processes the data feeds. The ITS may then automatically place remote operation calls when its confidence levels are consistently lower than those of the remote AI agent for a desired period of time, or when the mean squared difference of the confidence levels over a period is higher than a predefined threshold, or when other conditions are fulfilled. There may be a number of reasons behind this mode of operation. For instance, the partner providing the remote AI agent charges little for the option of maintaining it as a constantly available backup service, and charges a much higher price for the time duration its AI actually operates the vehicle.

In another embodiment, the marketplace may also support bids for human operator assistance. This class of bids should be placed in advance, as the human agent requires a longer response time to professionally assess the road situation. The marketplace algorithm for ranking available support may be based on a number of factors such as geographical proximity of the support system and the associated network latency, prior driving experience, or familiarity with the driving rules and regulations in the area being traversed by the vehicle.

In a further embodiment, the ITS may cancel a remote AI assistance request if the confidence levels advertised by third parties are found to be unsatisfactory and submits a human teleoperation request instead.

Figure 1:
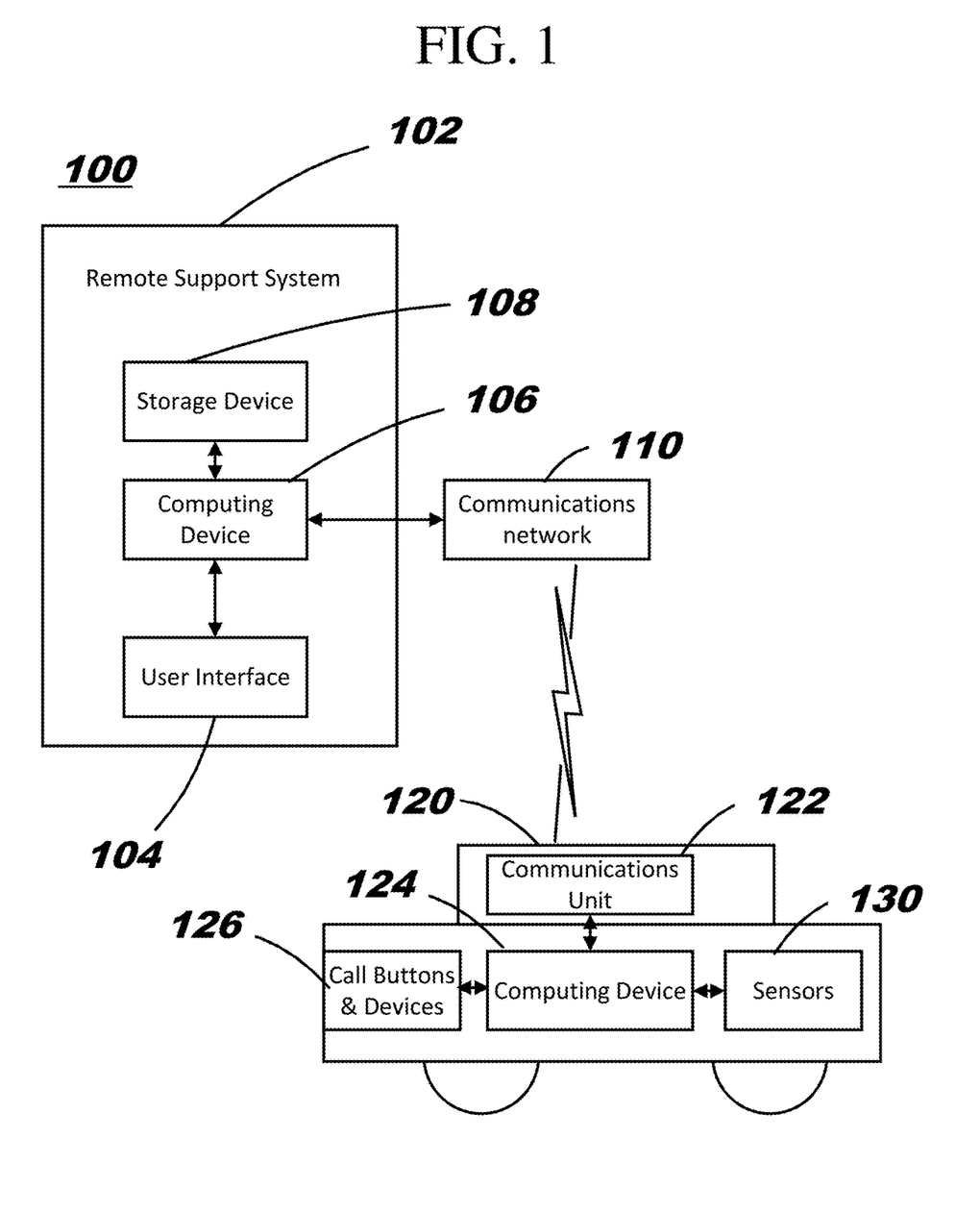
FIG. 1 depicts a function block diagram of the method and system, shown as one possible embodiment of the present disclosure, by which a control, or plurality of controls, accessible by a natural person inside or outside of the vehicle, or some other entity inside or outside of the vehicle, is implemented to request support from a remote support system.

FIG. 1 shows a block diagram of a system 100 for implementing support to a physical vehicle from a remote support system 102. The system 100 of FIG. 1 includes a remote support system 102 including a user interface 104, a computing device 106, a storage device 108; a communications network 110; a vehicle 120 including a communications unit 122, a computing device 124, and a plurality of call buttons 126 and sensors 130.

The vehicle 120 may be typically under the autonomous control of a system within the vehicle 120. Edge case situations may occur when it is preferable that the autonomous system is provided with support from some external source. This is of particular importance in potentially dangerous and/or unknown situations, in order to preserve the safety of vehicle passengers, and people and objects in the vehicle's surroundings. These edges cases may occur due to a variety of different scenarios. Some examples are: a situation that is outside of the operating design domain of the autonomous system in the vehicle, such as temporary roadworks that change the regular roadway layout; by passenger request; due to detected vehicle faults; or by request of some party outside the vehicle, such as law enforcement or emergency personnel. The embodiment described here describes a single vehicle 120 receiving support. In other embodiments, the remote support system 102 can be implemented to support multiple vehicles simultaneously, where, for example, there are single units of a computing device 106 and a storage device 108, and these are connected to a plurality of other units. For example, the remote support system 102 may include multiple units of the user interface 104 in order to enable a plurality of natural persons to work with the remote support system 102 simultaneously to support a plurality of vehicles.

The user interface 104 for use by a natural person may be implemented, for example, like standard vehicle controls, consisting of a computer display or a plurality thereof, a steering wheel, an acceleration pedal and brake pedal. Other embodiments may use different control methods, such as joysticks, touchscreens, voice control, gesture detection, buttons, levers and other methods. The user interface 104 may also provide audio input and output devices such as a microphone and a headset. The user interface 104 is used to control the movement of a vehicle 120 within the physical environment. The user interface 104 is connected communicatively to a computing device 106 that performs processing of data. A storage device 108 that is connected communicatively to computing device 106 is implemented, for example, to store data relating to user information and data relating to remote support. A communications network 122 is communicatively coupled to computing device 124, and may be any type of network or combination of networks known in the art, for transmitting data to vehicle 120 from the remote support system 102, and for receiving data from it.

In another embodiment, the user interface 104 is utilized by a robotic AI agent instead of a natural person. Such a solution may significantly reduce the complexity of switching between on-premises human and AI operators. A robotic AI agent may be equipped with a camera unit or a plurality thereof observing the displays showing video feeds (augmented or otherwise) received from the autonomous vehicle, and a collection of actuators capable of performing the same motions, operations and gestures as human limbs in the context of interaction with the user interface 104.

In an alternative embodiment, the remote support system 102 does not include displays or physical input/output interfaces, and is controlled by a software AI agent. Such an agent processes the video and telemetry feeds received from the vehicle directly in digital form without the intermediate step of producing analog outputs for consumption by a human or a robotic operator, and issues commands as well as produces feedback or other outputs accordingly.

The vehicle 120 is an entity that is to receive remote support. Communications unit 122 is connected communicatively to communications network 110, and can transmit and receive data across a plurality of networks suitable for communication with communications network 110. Computing device 124 is connected communicatively with communications unit 122. The computing device 124 implements, for example, the processing related with the method of collecting data from the call buttons and devices unit 126 and sensors unit 130. In one embodiment, call buttons and devices unit 126 comprise a plurality of components that can create an indication of a request for remote support. In a further embodiment, sensors unit 130 comprises a plurality of sensors, providing data to the remote support system 102.

Figure 2:
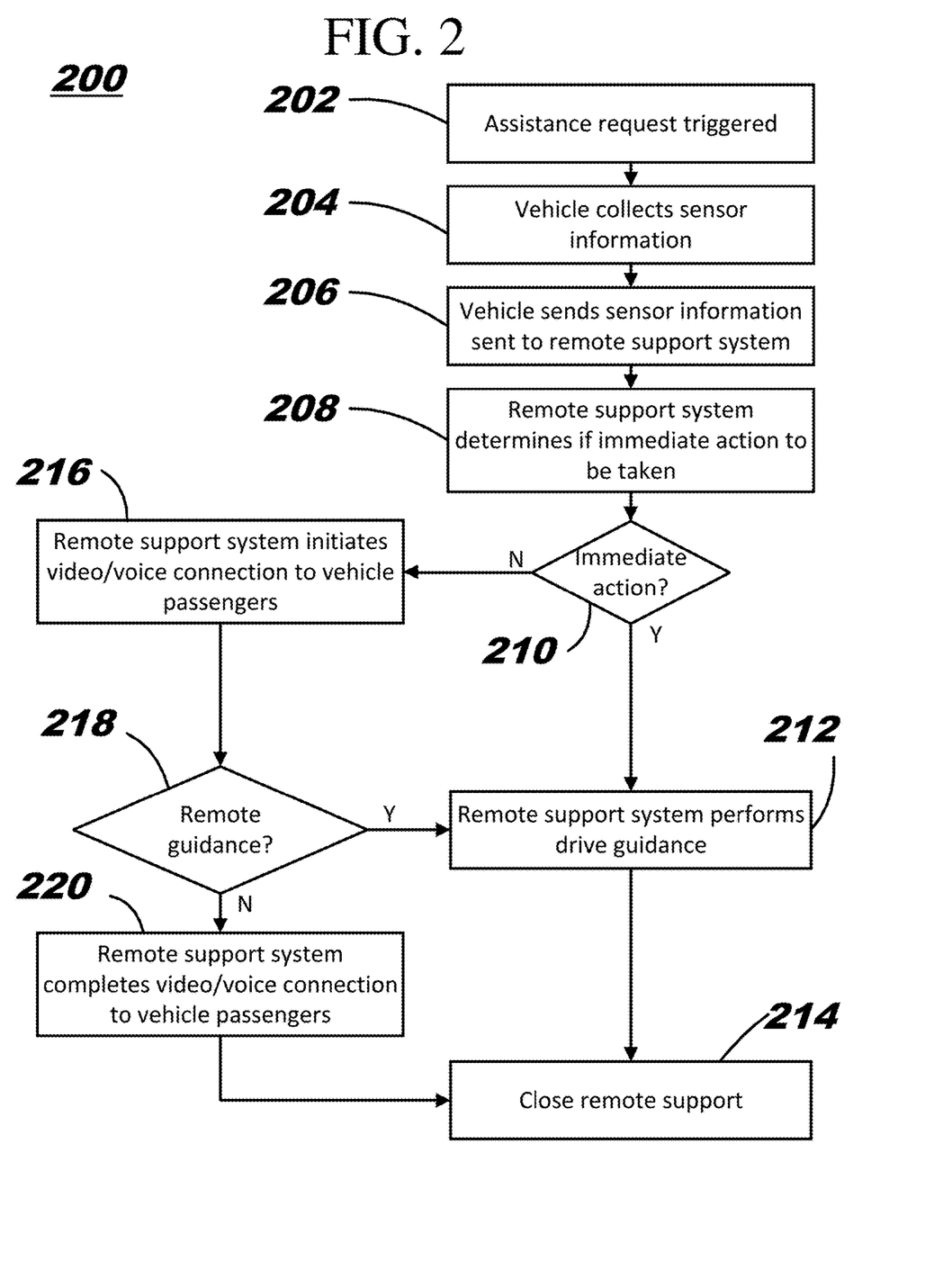
FIG. 2 illustrates a flow chart of an embodiment for implementing the request for support from a remote support system.

FIG. 2 illustrates a flowchart 200 describing the steps in a process for implementing a request for remote support.

At step 202, a request for remote support is initiated at the vehicle 120. The request may be triggered by one of a plurality of different sources including, but not limited to, a decision by the control system of vehicle 120, a passenger request using one of call buttons and devices unit 126, or a request external to the vehicle 120, such as by a law enforcement official, or a traffic management system using a suitable sensor in unit 130.

At step 204, the vehicle 120 collects sensor data information, and assesses the type and urgency of the request. The assessment may include a test whether the user is allowed to issue the specific request type made, and the urgency of the request.

At step 206, the vehicle 120 sends the request to the remote support system 102. A support connection may be established between the remote support system 102 and the vehicle 120 in response to the request.

At step 208, the remote support system 102 assesses if immediate action is required by the remote support system. This may occur if the vehicle requesting support is assessed to be in a potentially dangerous scenario. For example, in an embodiment, the vehicle 120 may send sensor information relating to a state of the vehicle 120 that may be analyzed by the remote support system 102 to assess whether or not the immediate action is required. In an embodiment, the remote support system 102 may generate an urgency metric associated with the detected state of the vehicle that represents an urgency of the remote support request. If the remote assistance request is processed by a remote agent instead of a natural person, the assessment may already be complete by the designated remote AI agent by the time a duplex communication channel is established.

If immediate action is possible and is immediately required (e.g., when the urgency metric exceeds a predefined threshold), at step 212 the remote support system 102 initiates an interaction with the vehicle 120. Remote support is provided until the support phase has been completed. At step 214, the connection with the remote support system 102 is closed, and control is returned to normal operation.

If immediate action is not desirable (e.g., the urgency metric does not exceed the predefined threshold), at step 210, then at step 216, the remote support system 102 initiates a voice and/or video link with the passenger(s) of the vehicle 120 for which the support request has been received. If the remote assistance request is processed by a remote AI agent instead of a natural person, the voice and/or video link with the occupants of the vehicle may be served by a robocall agent or an authorized support person such as a call center worker.

At step 218, the remote support system 102 determines the desired remote support intervention based on communications from the passenger. If the support includes remote drive guidance, the next process proceeds to step 212.

At step 212 the remote support system 102 performs drive guidance support until the support phase has been completed. At step 214, the connection with the remote support system 102 is closed, and control is returned to normal operation.

At step 218, if the remote support system 102 determines that no drive guidance is required, the process proceeds to step 220. At step 220, the remote support system 102 completes any voice and/or video connection with the vehicle 120 and terminates the communications and support connection.

At step 214, remote support is ceased, and normal operation of the vehicle 120 is resumed.

FIG. 3 this illustrates examples of embodiments of method of request support units implemented within a vehicle.

Figure 3A:
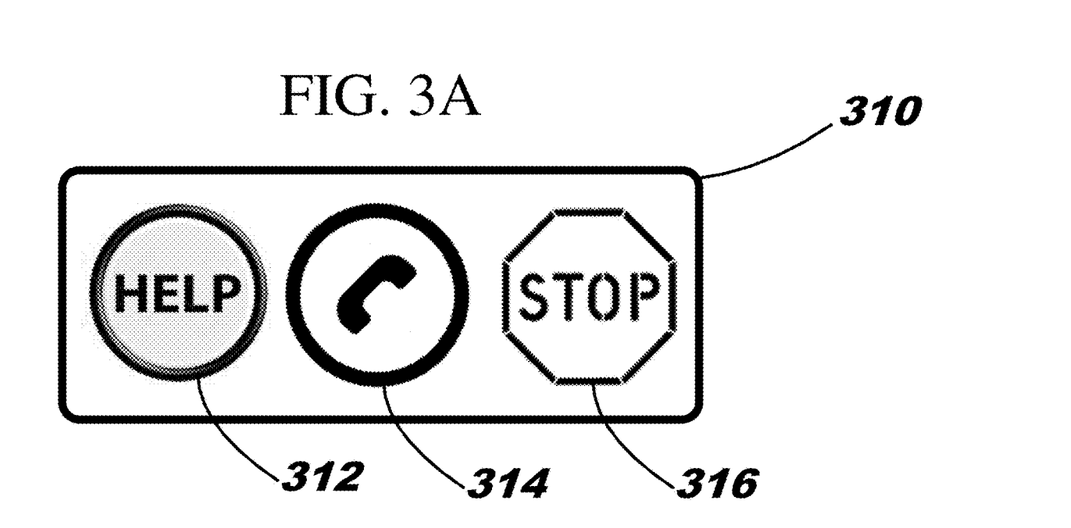
FIG. 3A shows an example of a plurality of buttons that may be used by a natural person to indicate the request type for remote support.
Figure 3B:
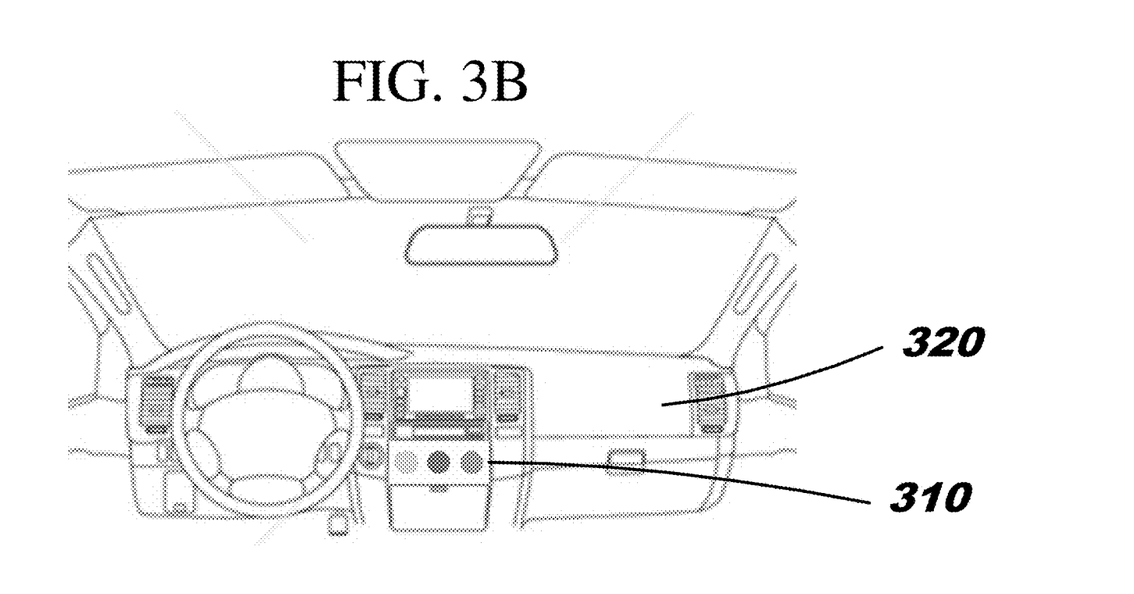
FIG. 3B illustrates an embodiment in which the call buttons are placed on a vehicle dashboard.
Figure 3C:
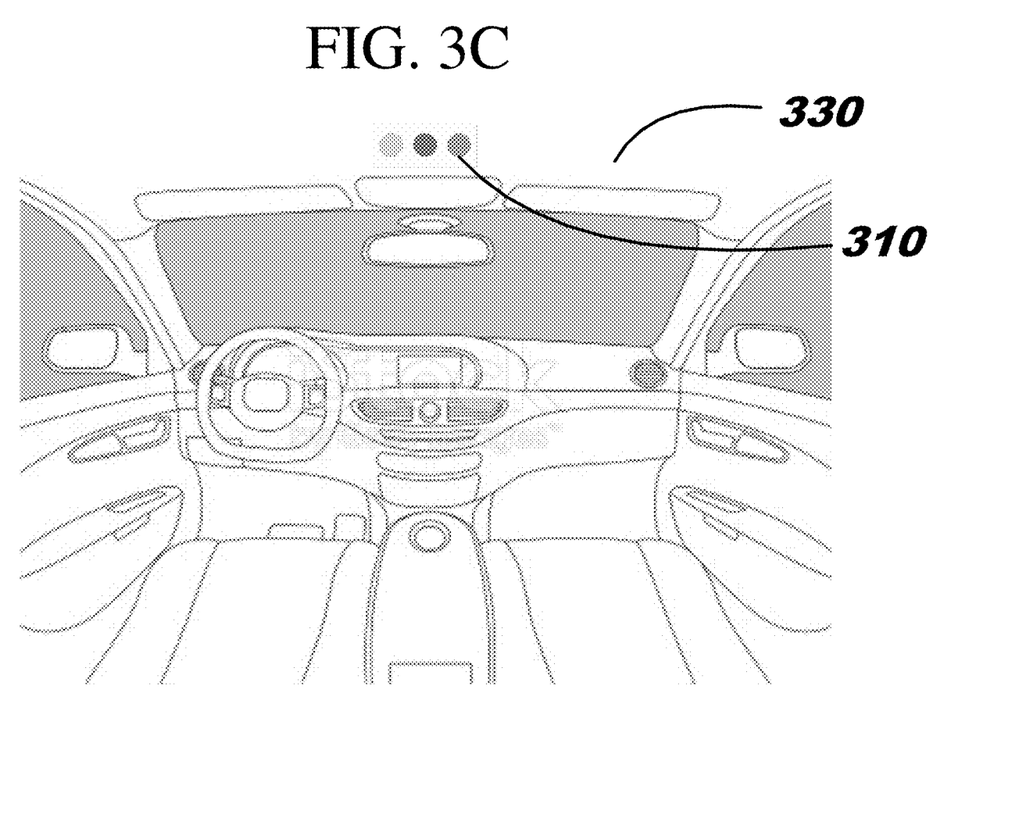
FIG. 3C illustrates an embodiment in which the call buttons are placed on the inside of the vehicle roof.
Figure 3D:
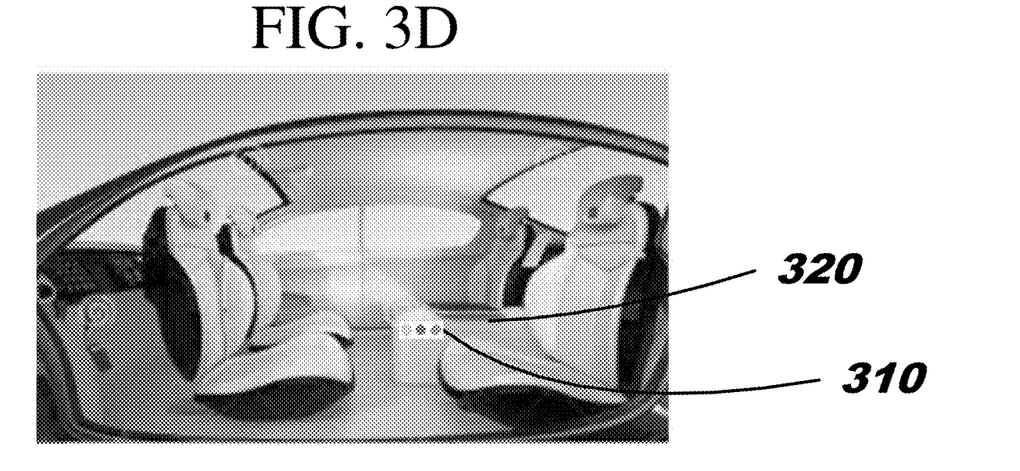
FIG. 3D illustrates an embodiment in which the call buttons are placed on a post within the vehicle.

FIG. 3A illustrates an embodiment of a request unit 310 for providing remote support for an autonomous vehicle 120. In this example, the request unit 310 includes, a safety button unit 312, a call button unit 314, and a stop button unit 316. In other embodiments, different combinations of button units may be implemented in addition to those shown. In certain implementations, the safety button unit 312 may alert the remote support system 102 for support including the remote support system 102 controlling the travel of the autonomous vehicle 120. FIG. 3B shows an example of placement of a request unit 310 on a vehicle's dashboard 320. FIG. 3C shows an example of placement of a request unit 310 on the inside of the vehicle's roofing 330. FIG. 3D shows an example of placement of a request unit 310 on a stand unit 340 within the vehicle 120.

FIGS. 4A-D illustrate examples of embodiments of units for supporting requests to a remote support system 102 from a party outside of the autonomous vehicle 120.

Figure 4A:
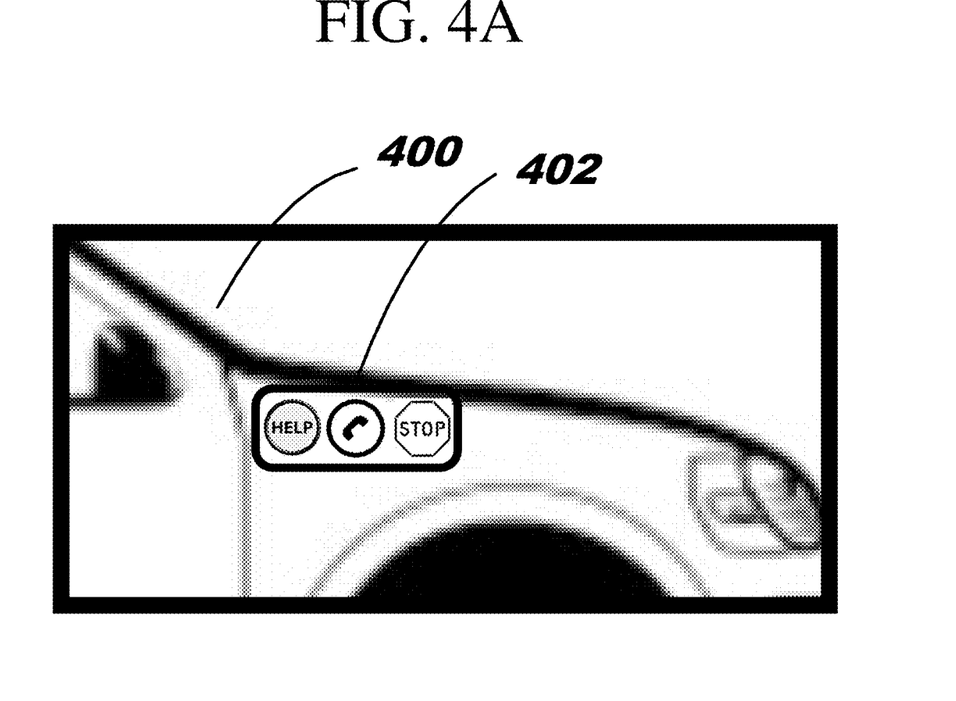
FIG. 4A shows a set of buttons on the outside of a vehicle for safety call and emergency stop.

FIG. 4A shows an embodiment with a call unit 402 on the outside of the vehicle 400, which may include a button to request a call connection with a remote support system 102. It may also include a button to request general assistance for the vehicle. This may include cases in which the requesting party does not wish to use the emergency stop as the preferred option.

Figure 4B:
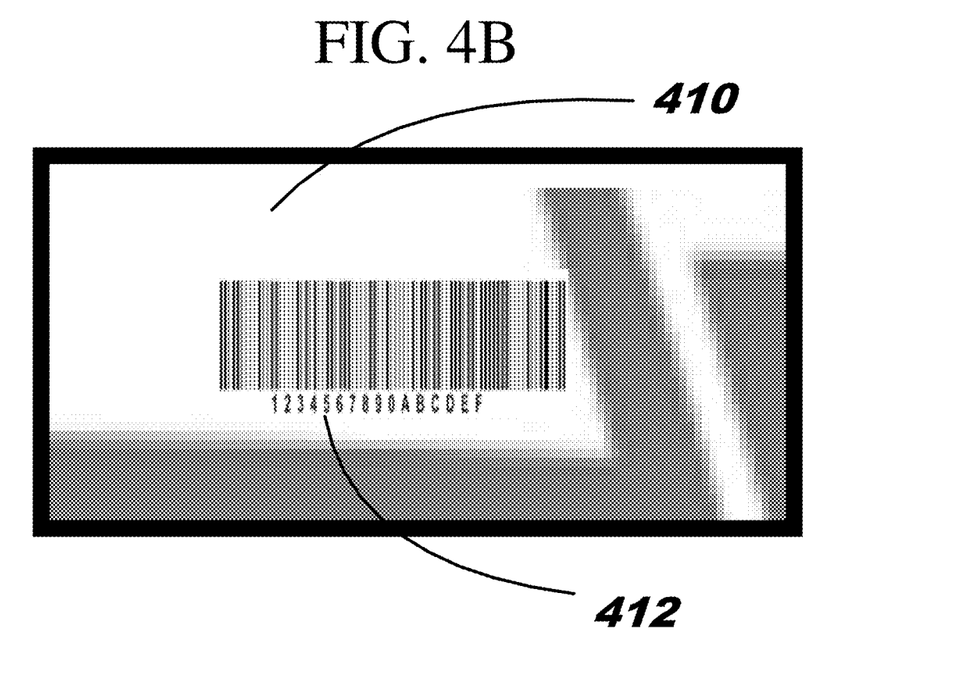
FIG. 4B shows a barcode unit accessible from outside of the vehicle to identify the vehicle for a call to a remote support system.

FIG. 4B shows an embodiment in which a barcode unit 412 is displayed to parties external to the vehicle 410 on a window, providing identifying information for the vehicle 120. The requesting party may then make a request to the remote support system 102 for remote support for the vehicle 120. In a further embodiment, the barcode unit 412 may provide data including driver information, and/or insurance information. In certain embodiments, the use of such a process may be limited to authorized personnel, such as police or safety officials.

Figure 4C:
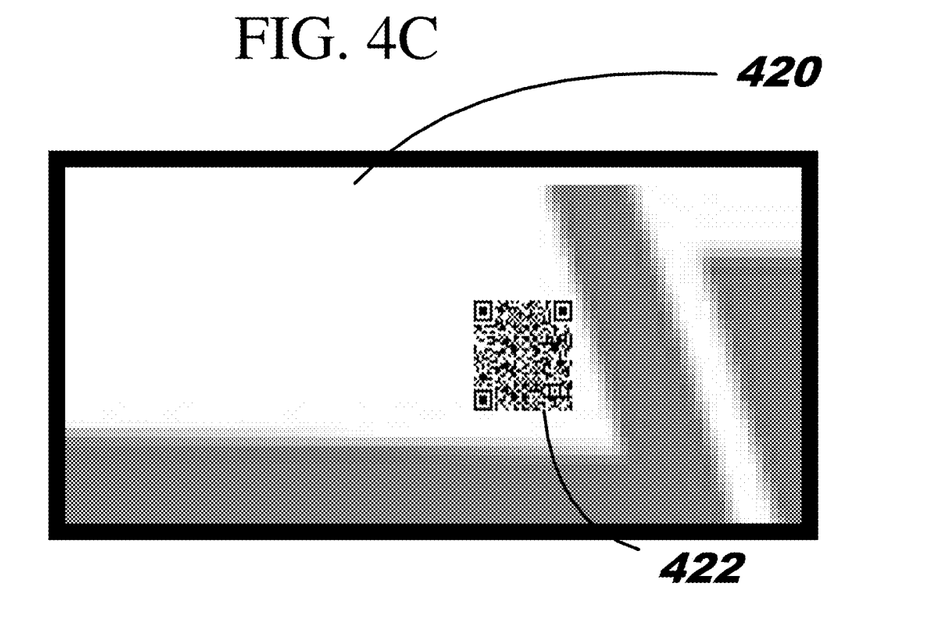
FIG. 4C shows a QR code unit accessible from outside of the vehicle to identify the vehicle for a call to a remote support system.

FIG. 4C shows an embodiment in which a QR code unit 422 is displayed to parties external to the vehicle 420 on a window, providing identifying information for the vehicle 120. The requesting party may then make a request to the remote support system 102 for remote support for the vehicle 120. In a further embodiment, the QR code unit 422 may provide data including driver information, and/or insurance information. In certain embodiments, the use of such a process may be limited to authorized personnel, such as police or safety officials.

Figure 4D:
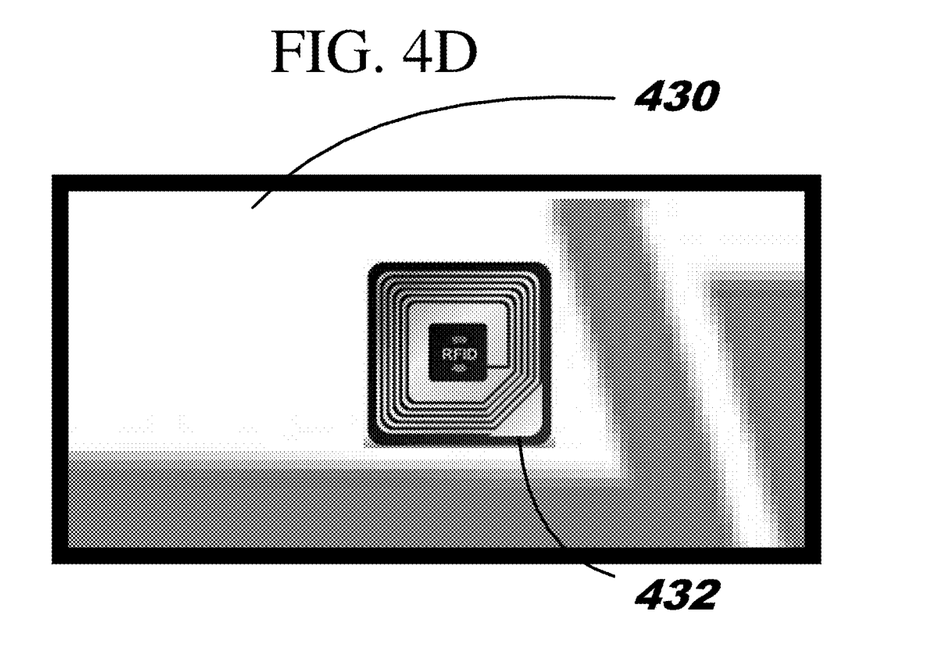
FIG. 4D shows an RFID code unit accessible from outside of the vehicle to identify the vehicle for a call to a remote support system.

FIG. 4D shows an embodiment in which an RFID tag unit 432 is available to parties external to the vehicle 430 on a window, providing identifying information for the vehicle 120. The requesting party may then make a request to the remote support system 102 for remote support for the vehicle 120. In a further embodiment, the RFID tag unit 432 may provide data including driver information, and/or insurance information. In certain embodiments, the use of such a process will be limited to authorized personnel, such as police or safety officials.

In the figures illustrated, certain examples of types of units are used, and these the units are shown placed at particular locations on the vehicle. In alternative embodiments, these units may be located in different portions of the vehicle 120 different than the locations shown.

In a further embodiment, an emergency stop procedure is executed if the connection between the remote support system 120 and the vehicle 120 is found to be severed or not meeting the requirements of the remote support system. For instance, the remote support system 120 may send keep-alive signals in t ms pulses, and the vehicle 120 may maintain an emergency braking countdown of T ms where T>t. Upon receiving a pulse, the vehicle 120 resets the countdown to a maximum value. If the countdown reaches zero, an emergency braking procedure takes place.

In a further embodiment, the emergency stop system may be activated both for a vehicle 120 in a support mode under control of the remote support system 102 and for a vehicle that is currently in the autonomous driving mode.

In a further embodiment, the emergency stop system may immediately command a drive-by-wire system of the vehicle 120 to set throttle to 0%, braking to 100% and activate the hazard lights, or perform a subset of these actions depending on circumstances. After the vehicle 120 has been halted, the emergency stop button may command the drive-by-wire system to set the gear to parking, activate the parking brake, or perform both of these actions.

In a further embodiment, the emergency stop mode may be disabled if the connection of the remote support system 102 to the vehicle 120 is found to be restored. Alternatively, if the emergency stop mode was earlier activated by the remote support system 102 and not by the connection monitor of the vehicle 120, an action by the remote support system 102 may be initiated disable the emergency stop mode.

In a further embodiment, the emergency stop system may be decoupled from the data flows carrying information used by other support service subsystems such as video streams, telemetry feeds and operator command streams.

Figure 5:
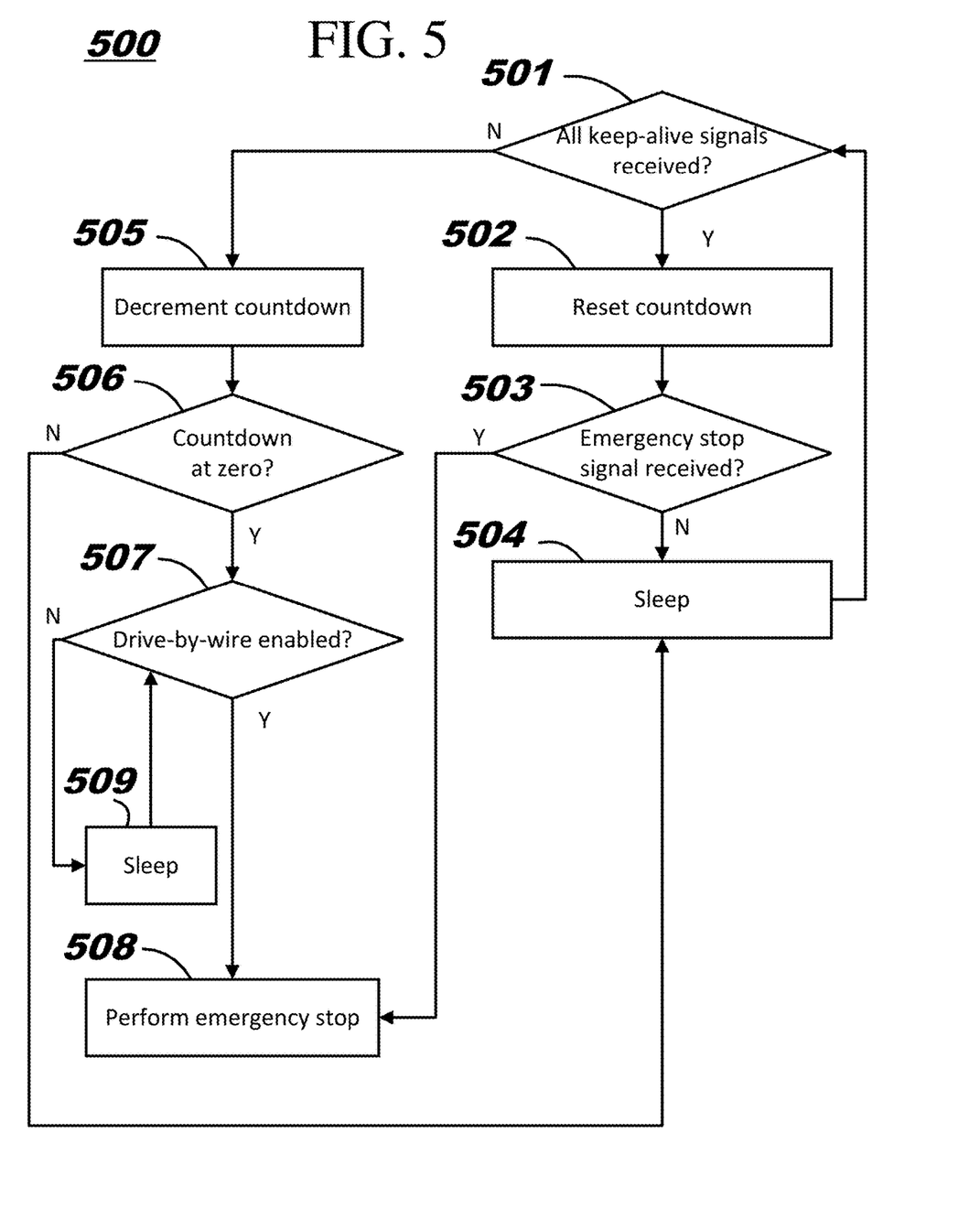
FIG. 5 illustrates an example workflow of an emergency stop button mechanism implementation.

FIG. 5 illustrates an example embodiment of a process 500 for operating an emergency stop system of a vehicle 120. The described process iterates in a loop after initialization for the whole duration of a remote support session or a part thereof. In step 501, the emergency stop system checks whether all keep-alive signals have been successfully received. Keep-alive signals may be emitted by various components of the remote support system 102 such as video feed transmission or control channel subsystems. If all of the keep-alive signals have been received, in step 502, the emergency stop system resets a countdown maintained by the emergency stop system to an initial value. The emergency stop system checks 503 if an emergency stop signal is received from the remote support system 102. If no emergency stop has been commanded by the operator, then in step 504 the emergency stop system sleeps for a designated time duration. Following the sleep duration, the process returns to the initial step 501. Alternatively, if an emergency stop signal is received from the remote support system 102 in step 503, then in step 508, the emergency stop system performs an emergency stop of the vehicle 120.

If, in step 501, one or more keep-alive signals have not been received in an allocated time interval, the emergency stop system decrements the countdown in step 505. The emergency stop system then checks in step 506 whether the countdown value has reached zero. If the countdown value reaches zero, the emergency stop system verifies in step 507 that a drive-by-wire interface of the vehicle 120 is active. If the drive-by-wire interface is not active, the emergency stop system enters a sleep mode in step 509 for a predefined time period. Following the predefined time period, the emergency stop system exists the sleep mode and returns to step 507 to re-check if the drive-by-wire interface is active. If the drive-by-wire interface is active, the emergency stop system performs the emergency stop in step 508.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the scope of the embodiments.

The invention claimed is:

1. A method for operating an autonomous drive system of a vehicle in communication with a remote support system, the method comprising:

requesting, from the remote support system, support for the autonomous drive system of the vehicle;
setting a counter of the vehicle to a predefined value;
at a predefined time interval, checking if the vehicle received a keep alive signal from the remote support system;
responsive to failing to receive the keep alive signal in the predefined time interval,
decrementing the counter of the vehicle;
detecting if a drive-by-wire system of the vehicle is enabled;
responsive to the drive-by-wire system not being enabled, entering a sleep mode for a predefined time period;
responsive to entering the sleep mode for the predefined time period:
exiting the sleep mode after the predefined time period;
detecting if the drive-by-wire system of the vehicle is enabled; and
responsive to the drive-by-wire system being enabled, controlling a braking system of the vehicle to execute an emergency stop responsive to the counter reaching zero by sending a command through the drive-by-wire system.

2. The method of claim 1, further comprising:
responsive to receiving the keep alive signal, resetting the counter to the predefined value.

3. The method of claim 1, further comprising:
receiving an emergency stop command from the remote support system to execute the emergency stop; and
controlling the braking system of the vehicle to execute the emergency stop responsive to the emergency stop command.

4. The method of claim 1, wherein requesting the support comprises:
detecting selection of a user interface control within the vehicle to request the support; and
sending a request for the support in response to the selection.

5. A non-transitory computer-readable storage medium storing instructions executable by a processor for operating an autonomous drive system of a vehicle in communication with a remote support system, the instructions when executed by the processor causing the processor to perform steps comprising:
requesting, from the remote support system, support for the autonomous drive system of the vehicle;
setting a counter of the vehicle to a predefined value;
at a predefined time interval, checking if the vehicle received a keep alive signal from the remote support system;
responsive to failing to receive the keep alive signal in the predefined time interval, decrementing the counter of the vehicle;
detecting if a drive-by-wire system of the vehicle is enabled;
responsive to the drive-by-wire system not being enabled, entering a sleep mode for a predefined time period;
responsive to entering the sleep mode for the predefined time period:
exiting the sleep mode after the predefined time period;
detecting if the drive-by-wire system of the vehicle is enabled; and
responsive to the drive-by-wire system being enabled, controlling a braking system of the vehicle to execute an emergency stop responsive to the counter reaching zero by sending a command through the drive-by-wire system.

6. The non-transitory computer-readable storage medium of claim 5, wherein the instructions further causing the processor to perform steps including:
responsive to receiving the keep alive signal, resetting the counter to the predefined value.

7. The non-transitory computer-readable storage medium of claim 5, wherein the instructions further causing the processor to perform steps including:
receiving an emergency stop command from the remote support system to execute the emergency stop; and
controlling the braking system of the vehicle to execute the emergency stop responsive to the emergency stop command.

8. The non-transitory computer-readable storage medium of claim 5, wherein requesting the support comprises:
detecting selection of a user interface control within the vehicle to request the support; and
sending a request for the support in response to the selection.

9. A vehicle comprising:
a communication unit for communicating with a remote support system;
an autonomous drive system configured to control an operation of the vehicle;
a processor; and
a non-transitory computer-readable storage medium storing instructions executable by the processor for operating the autonomous drive system of the vehicle, the instructions when executed by the processor causing the processor to perform steps comprising:
requesting, from the remote support system, support for the autonomous drive system of the vehicle;
setting a counter of the vehicle to a predefined value;
at a predefined time interval, checking if the vehicle received a keep alive signal from the remote support system;
responsive to failing to receive the keep alive signal in the predefined time interval, decrementing the counter of the vehicle;
detecting if a drive-by-wire system of the vehicle is enabled;
responsive to the drive-by-wire system not being enabled, entering a sleep mode for a predefined time period;
responsive to entering the sleep mode for the predefined time period:
exiting the sleep mode after the predefined time period;
detecting if the drive-by-wire system of the vehicle is enabled; and
responsive to the drive-by-wire system being enabled, controlling a braking system of the vehicle to execute an emergency stop responsive to the counter reaching zero by sending a command through the drive-by-wire system.

10. The vehicle of claim 9, wherein the instructions further causing the processor to perform steps including:
responsive to receiving the keep alive signal, resetting the counter to the predefined value.

11. The vehicle of claim 9, wherein the instructions further causing the processor to perform steps including:
receiving an emergency stop command from the remote support system to execute the emergency stop; and
controlling the braking system of the vehicle to execute the emergency stop responsive to the emergency stop command.

12. The vehicle of claim 9, wherein requesting the support comprises:

detecting selection of a user interface control within the vehicle to request the support; and sending a request for the support in response to the selection.

\* \* \* \* \*